US012218945B2

(12) United States Patent
Calegari et al.

(10) Patent No.: US 12,218,945 B2
(45) Date of Patent: Feb. 4, 2025

(54) PROCESS AND SYSTEM FOR MANAGING DATA FLOWS FOR THE UNIFIED GOVERNANCE OF A PLURALITY OF INTENSIVE COMPUTING SOLUTIONS

(71) Applicant: BULL SAS, Les Clayes-sous-Bois (FR)

(72) Inventors: Patrice Calegari, Boissy-sous-Saint-Yon (FR); Marc Levrier, Saint-cry-sous-Dourdan (FR)

(73) Assignee: BULL SAS, Les Clayes sous Bois (FR)

( * ) Notice: Subject to any disclaimer, the term of this patent is extended or adjusted under 35 U.S.C. 154(b) by 864 days.

(21) Appl. No.: 17/132,592

(22) Filed: Dec. 23, 2020

(65) Prior Publication Data

US 2021/0203665 A1     Jul. 1, 2021

(30) Foreign Application Priority Data

Dec. 27, 2019    (FR) ...................................... 1915664

(51) Int. Cl.
    *H04L 9/40*          (2022.01)
    *G06F 9/48*           (2006.01)
    (Continued)

(52) U.S. Cl.
    CPC .......... *H04L 63/105* (2013.01); *G06F 9/4881* (2013.01); *G06F 16/22* (2019.01);
    (Continued)

(58) Field of Classification Search
CPC . H04L 63/105; H04L 63/0853; G06F 9/4881; G06F 16/22; G06F 16/24568; G06F 16/953; G06N 10/00; G06N 20/00
See application file for complete search history.

(56) References Cited

U.S. PATENT DOCUMENTS

| 9,105,000 B1* | 8/2015 | White | G06F 16/244 |
| 2014/0115565 A1* | 4/2014 | Abraham | G06F 11/368 |
| | | | 717/131 |

(Continued)

FOREIGN PATENT DOCUMENTS

| EP | 2254310 A2 | 11/2010 |
| EP | 3109759 A1 | 12/2016 |
| WO | 2013158707 A1 | 10/2013 |

OTHER PUBLICATIONS

French Search Report issued in corresponding French Application No. 1915664 dated Jul. 16, 2020, 2 pages.

*Primary Examiner* — Fatoumata Traore
*Assistant Examiner* — Carlton Johnson
(74) *Attorney, Agent, or Firm* — ARC IP Law, PC; Joseph J. Mayo

(57) ABSTRACT

The invention relates to a system and method for managing the data streams for unified governance of a plurality of intensive computing solutions (70) accessible to a user client (2) from an aggregated interface (10), said intensive computing solutions including at least two solutions selected among: a high performance computing server (71), a server dedicated to supervised or unsupervised learning (72) and a server dedicated to quantum computing (73); said method being implemented at least partly by said computer system including: at least one database (25*a*) configured to store execution data for intensive computing operations; said method including the steps of storing (300) execution data for the intensive computing solutions (70) and transmitting (400) execution data for the intensive computing solutions to the aggregated interface (10).

19 Claims, 7 Drawing Sheets

(51) Int. Cl.
*G06F 16/22* (2019.01)
*G06F 16/2455* (2019.01)
*G06N 10/00* (2022.01)
*G06N 20/00* (2019.01)

(52) U.S. Cl.
CPC ....... *G06F 16/24568* (2019.01); *G06N 10/00* (2019.01); *G06N 20/00* (2019.01); *H04L 63/0853* (2013.01)

(56) References Cited

U.S. PATENT DOCUMENTS

| | | |
|---|---|---|
| 2018/0039565 A1 | 2/2018 | Rajagopalan et al. |
| 2018/0324204 A1* | 11/2018 | McClory ............... G06F 9/5027 |
| 2019/0253335 A1* | 8/2019 | Yadav .................... H04L 43/50 |
| 2019/0325302 A1 | 10/2019 | Savic et al. |
| 2019/0361697 A1* | 11/2019 | Hu .......................... G06F 8/433 |
| 2020/0250074 A1* | 8/2020 | Zhang ................ G06F 11/3664 |

* cited by examiner

PROCESS AND SYSTEM FOR MANAGING DATA FLOWS FOR THE UNIFIED GOVERNANCE OF A PLURALITY OF INTENSIVE COMPUTING SOLUTIONS

The invention relates to the field of high performance computing and more particularly to the interfacing to a single platform of several intensive computing solutions having different business logics. The invention concerns in particular a method for managing the data streams for unified governance within the framework of a platform centralizing the access to a plurality of intensive computing solutions. Furthermore, the invention concerns a computer system for managing the data streams for the unified governance capable of managing the data streams accessible at an aggregated interface of a user client or transmitted from this aggregated interface within the framework of a platform centralizing the access to a plurality of intensive computing solutions.

PRIOR ART

The High Performance Computing, also called HPC is being developed for university research as well as for industry, in particular in technical fields such as aeronautics, energy, climatology and life sciences. This computing is generally implemented by clusters. The objective of these clusters is to overcome the limitations on the existing hardware by pooling resources to allow the parallel execution of instructions and the memory capacity and disk aggregation. A cluster is a set of computing means (also called nodes or servers) interconnected by an interconnection network that can perform common operations. The High Performance Computing (HPC) is adopted by more and more scientists to help them solve their complex problems. Particularly, with an increase between 2017 and 2018 of more than 50% of the power of the most powerful computer in the world, the computing power of the supercomputers is constantly increasing. In addition, there is an increasing number of computing centers (local, regional, national and international centers) equipped with petaflop-class systems. Since it is not possible for all the users to invest in the computer architectures capable of deploying such computing powers, some have specialized in providing access to these high performance computing solutions.

Thus, the last few years witnessed the emergence of platforms of access to intensive computing solutions (EP3109759). Particularly, many HPC portals have been developed. Internet portals are a common way to access the information and the services available on the computer networks.

The portals often provide a single point of access to the data and applications. Furthermore, a portal can present a unified and customized view of information to the users.

Many HPC projects are developing their own community-specific Web portal and some HPC cloud providers have developed Web portals for their own use. The relationships between the portal and these information and storage systems are essential but complex to implement in a secure and efficient manner. The data processed in HPC environments can be very confidential (particularly for industries or financial organizations). The HPC portals need to manage these constraints in the way they execute the services on the main server (via impersonation, i.e. they execute the service "as" authenticated user), as well as in the way they display or filter the information in the HPC portal.

Furthermore, beyond the computing power and the high performance computing, the user scientists wish to be able to access intensive computing solutions such as quantum machines, quantum simulation, Deep Learning platforms or more broadly dedicated to the development of artificial intelligence solutions.

However, each of these solutions is hosted or made accessible by companies dedicated to either of these technologies and the use, in particular simultaneous use, of these different intensive computing solutions, becomes laborious.

Furthermore, the interaction with each of these intensive computing solutions is often made laborious by the heterogeneity of the communication protocols with these computing solutions and the impossibility of centralizing the information in real-time coming from these different solutions.

Thus, with the proliferation of the typologies of intensive computing solutions and the complementarity of some of these solutions, it appears necessary to have a platform allowing indifferently accessing different intensive computing solutions in a secure, homogenous and transparent manner with a management of the information streams such as the execution data for these intensive computing solutions.

TECHNICAL PROBLEM

The aim of the invention is therefore to overcome the drawbacks of the prior art. Particularly, the aim of the invention is to propose a method for managing the data streams accessible at an aggregated interface of a user client, in particular within the framework of unified governance of a plurality of intensive computing solutions, said method making it possible to transmit to the aggregated interface updated data of the execution data for a plurality of intensive computing solutions. The aim of the invention is also to propose a computer system for managing the data streams accessible at an aggregated interface of a user client. Such a computer system allows hiding the complexity of the data streams exchanged with the intensive computing solutions, making possible the management of complex and multidisciplinary workflows and managing the expectations of a multitude of users while remaining compatible with the responsiveness of the schedulers of a plurality of intensive computing solutions.

BRIEF DESCRIPTION OF THE INVENTION

To this end, the invention relates to a method for managing the data streams accessible at an aggregated interface of a user client for unified governance of a plurality of intensive computing solutions able to generate execution data for intensive computing operations, said intensive computing solutions including at least two solutions selected among: a high performance computing server, a server dedicated to supervised or unsupervised learning, and a server dedicated to quantum computing;

said method for managing the data streams being implemented at least partly by a computer system for managing the data streams including: a proxy microservice, a computing microservice for each of the intensive computing solutions and at least a first database configured to store execution data for intensive computing operations, said method for managing the data streams including the steps of:

storing execution data for the intensive computing solutions, said storage including:

a receipt, by a first computing microservice, of first execution data for intensive computing operations generated by a first intensive computing solution, a storage, on the at least a first database, of the first execution data for intensive computing operations, a receipt, by a second computing microservice, of second execution data for intensive computing operations generated by a second intensive computing solution, a storage, on the at least a first database, of the second execution data for intensive computing operations, transmitting execution data for the intensive computing solutions, said transmission including:

a receipt, by the proxy microservice, of a request for information on the execution of intensive computing operations from a user client, an identification, on the at least a first database, of the execution data for intensive computing operations corresponding to the information request, and a transmission, by the proxy microservice, of the identified execution data for intensive computing operations, to the user client.

The method according to the invention is implemented within the framework of unified governance of a plurality of intensive computing solutions that allow exposing, according to a single model, models and fields of very varied intensive or high performance computing applications: High Performance Parallel Computing, Artificial Intelligence, Deep Learning and quantum computing simulation. This unified governance allows general convergence of various fields seeking to exploit the power and flexibility of computing clusters or supercomputers as well as their cloud use.

The existing platforms for access to intensive computing solutions are specialized in a particular computing method and the software architectures concerned are not capable of managing the complexity of interacting with several computing intensive solutions.

Likewise, while microservices are used in many areas of IT, they have not been offered in a single architecture capable of aggregating data from or to different intensive computing solutions, each with their own specificities.

Indeed, in the absence of a suitable structure, it is not easy to design an architecture capable of managing the specificities of each of the intensive computing solutions while coordinating them from a single point. Thus, current solutions are not capable of managing the schedulers of several intensive computing solutions and processing flows representing very heterogeneous system loads on equally heterogeneous hardware. Likewise, architectures, based exclusively on microservices, offered in other areas of IT are not applicable to a solution that must aggregate several intensive computing solutions.

Moreover, a microservice corresponds by definition to a service that can "fit" in a virtual machine or a container, these two objects can never allocate more physical resources than the physical server (node) that hosts them. Conversely, a single scientific computation job, especially for a parallel distributed memory application (the most important case), aggregates the power of several tens, hundreds or thousands of these physical servers (nodes). Conversely, it is akin to a macro-job and is thus in total opposition to the various virtualization models that have made it possible to popularize the microservice approach.

Finally, most scientific computing applications, in particular in the very broad field of trades using digital simulation, have been developed on very old models (20, 30 years or even more), totally unsuitable for a connected, orchestrated or based on dynamic discovery. Most of these applications can be not integrated into a microservices framework. The idea here is to develop all of the state of the art middleware, themselves in the form of microservices, to drive a large number of applications on one or more high-performance infrastructures that can not themselves conform to this model.

The present invention allows to overcome the drawbacks thanks to a complementary use of the computing microservices, each being dedicated to an intensive computing solution cooperating with a proxy microservice and an aggregated interface.

Particularly, the method according to the invention allows a management of the data streams within unified governance of a plurality of intensive computing solutions. Such a method allows hiding the complexity of the interactions with the intensive computing solutions and decoupling the exchanges between the user clients and the intensive computing services, particularly their schedulers. Thus, it is possible to manage the expectations of a multitude of users while remaining compatible with the responsiveness of an intensive computing scheduler.

Thus, the method according to the invention allows a synchronized and real-time access to the execution data produced by intensive computing services, in particular thanks to a management of the timing of the requests between the user clients and the intensive computing services.

Furthermore, in addition to providing an aggregated interface that allows integrating several intensive computing solutions and making them compatible with the classic software products, the presence of the different abstraction layers in the form of microservices allows a standardization of the exchanges and a standardization of the views (interfaces).

According to Other Optional Characteristics of the Method:

the intensive computing solutions include servers coupled to schedulers configured to plan an execution of intensive computing operations on the servers, monitor the execution of these operations and transmit the generated execution data for intensive computing operations, to a computing microservice. The interaction between the microservices and the schedulers allow smoothing the governance and reducing the demands for the intensive computing solutions.

the transmission of execution data for the intensive computing solutions includes an automated and recurring transmission of the identified execution data for intensive computing operations, to the user client. Thus, the method allows a continuous and automated analysis of the execution data.

the aggregated interface is composed of a plurality of portlets, each portlet being associated with an intensive computing solution and wherein the transmission of execution data for the intensive computing solutions includes a transmission of the execution data for intensive computing operations of a given intensive computing solution, to the portlet associated therewith. This allows smoothing the data communication and hiding the complexity of the interoperability of the intensive computing solutions.

the computer system for managing the data streams further includes at least a second database configured to store instruction data for intensive computing operations and wherein said method for managing the data streams then includes steps of:

storing instruction data for intensive computing operations, said storage including:
- a receipt, by the proxy microservice, of a first computing request from a user client, said first computing request including first instruction data for intensive computing operations,
- a storage, on the at least a second database, of the first instruction data for intensive computing operations,
- a receipt, by the proxy microservice, of a second computing request from the user client, said second computing request including second instruction data for intensive computing operations,
- a storage, on the at least a second database, of the second instruction data for intensive computing operations, transmitting instruction data for intensive computing operations, said transmission including:
- an identification, by the proxy microservice and on the at least a second database, of untransmitted instruction data for intensive computing operations,
- an identification, by the proxy microservice, of a destination intensive computing solution for each of the untransmitted instruction data for intensive computing operations, and
- a transmission, by the proxy microservice, of the untransmitted instruction data for intensive computing operations, to the computing microservice of each of the destination intensive computing solutions.

Thus, the computing instructions of a plurality of users can be transmitted in batch to the schedulers of each of the computing solutions.

the computer system for managing the data streams further includes a scheduler coupled to the second database configured to plan the transmission, by the proxy microservice, of the untransmitted instruction data for intensive computing operations, to the computing microservice of each of the destination intensive computing solutions.

the first and second execution data for intensive computing operations are selected among:
- Computing input files accessible and processable by several intensive computing solutions;
- computing results accessible and processable by several computing microservices;
- energy consumption measurements;
- resource use measurements;
- system parameters;
- descriptions of the hardware infrastructures;
- use index data for the intensive computing processes; and
- duration data before completion of the computing.

it includes a procedure for generating an aggregated data accessible at the aggregation interface of the client user, said procedure for generating an aggregated data including the steps of:
- receiving, by the proxy microservice, access command information of a user client, contained in a message coming from an aggregated interface,
- determining data accessible to the user client, by each of the computing microservices, said determination being based at least partly on the access command information,
- determining data to be aggregated, by the proxy microservice, from the accessible data determined by each of the computing microservices,
- generating an aggregated data from the data to be aggregated, by the proxy microservice, from the accessible data determined by each of the computing microservices, and
- transmitting the aggregated data, by the proxy microservice, to the aggregation interface of the user client.

This allows eliminating the data redundancy between the intensive computing solutions towards a user client. Furthermore, such a procedure allows having scalable ergonomics, adapted to each new intensive computing solution. Thus, the method according to the invention proposes a single entry point towards the different business logics (backends) and this with unified ergonomics (e.g. standardized workflow buttons, menus, logics . . . ).

the unified governance is ensured by a computer system for managing the data streams further including a token security microservice, at least one security repository and at least one authorization repository, said method including a procedure for managing the authorizations granted to a user client including the steps of:
- receiving, by the token security microservice, access information of a user client,
- authenticating the user client and determining, by the token security microservice, at least one role attribute for the user client from the access command information and data stored in the security repository,
- generating a token, by the token security microservice, said token allowing an access to all the intensive computing solutions accessible to said user client based on the at least one determined role attribute, and
- determining authorizations granted to the user client, by the at least one computing microservice, said determination being based on the at least one determined role attribute and data contained in the at least one authorization repository.

Such a procedure allows a single sign on for all the microservices with a single management of the roles and identities. For that purpose, one part of the security verification of the unified governance in an execution environment is advantageously carried out by the token security microservice of the computer system for generating an aggregated data. Particularly, security is ensured via an authorization framework that can be based on a role management, an authorization policy management, a token-based control mechanism, a delegation of the management of the identities and a delegation of the authentication mechanisms. This process allows coupling a very flexible and generic (ensured by the security microservice) and very accurate (ensured by each of the intensive computing solution microservices) authentication. Indeed, the token security microservice allows assigning a role but it is not able to perform a fine-grained assignment of authorizations to each of the functionalities of the different intensive computing solutions. The token security microservice is then for example completed by a catalog of special authorizations in the computing microservices. This catalog can be implemented as a table in the database of the backend (either in its own microservice or in a dedicated microservice). Thus, the method according to the invention proposes an authorization management within the framework of a solution proposing a single entry point towards the different business logics (backends) and this with unified ergonomics (e.g. standardized workflow buttons, menus, logics . . . )

The access information of a user client comes from a message sent from an aggregated interface of the user client to the proxy microservice.

the message coming from the user client includes identification data of the user client.

Other implementations of this aspect comprise computer systems, apparatuses and corresponding computer programs recorded on one or several computer storage devices, each being configured to perform the actions of a method according to the invention. Particularly, a system of one or several computers can be configured to perform particular operations or actions, in particular a method according to the invention, through the installation of a software, firmware, hardware or a combination of software, firmware or hardware installed on the system. Furthermore, one or several computer programs can be configured to perform particular operations or actions through instructions which, when executed by a data processing apparatus, cause the apparatus to perform the actions.

Thus, the invention also relates to a computer system for managing the data streams accessible at an aggregated interface of a user client for unified governance of a plurality of accessible intensive computing solutions able to generate execution data for intensive computing operations, said intensive computing solutions including at least two solutions selected among: a high performance computing server, a server dedicated to supervised or unsupervised learning and a server dedicated to quantum computing:

said computer system for managing the data streams including: a proxy microservice, a computing microservice for each of the intensive computing solutions and at least a first database configured to store execution data for intensive computing operations;

said computer system for managing the data streams being configured to execute the steps of:
  storing execution data for intensive computing solutions, said storage including:
    a receipt, by a first computing microservice, of first execution data for intensive computing operations generated by a first intensive computing solution,
    a storage, on the at least a first database, of the first execution data for intensive computing operations,
    a receipt, by a second computing microservice, of second execution data for intensive computing operations generated by a second intensive computing solution,
    a storage, on the at least a first database, of the second execution data for intensive computing operations,
  transmitting execution data for the intensive computing solutions, said transmission including:
    a receipt, by the proxy microservice, of a request for information on the execution of intensive computing operations from a user client,
    an identification, on the at least a first database, of the execution data for intensive computing operations corresponding to the information request, and
    a transmission, by the proxy microservice, of the identified execution data for intensive computing operations, to the user client Such a computer system allows decoupling the exchanges between the user client(s) and the intensive computing solutions, particularly their possible schedulers. Thus, it is possible to manage the expectations of a multitude of users while remaining compatible with the responsiveness of the intensive computing services.

Other advantages and characteristics of the invention will become apparent upon reading the following description given by way of illustrative and non-limiting example, with reference to the appended figures.

Figure 1:
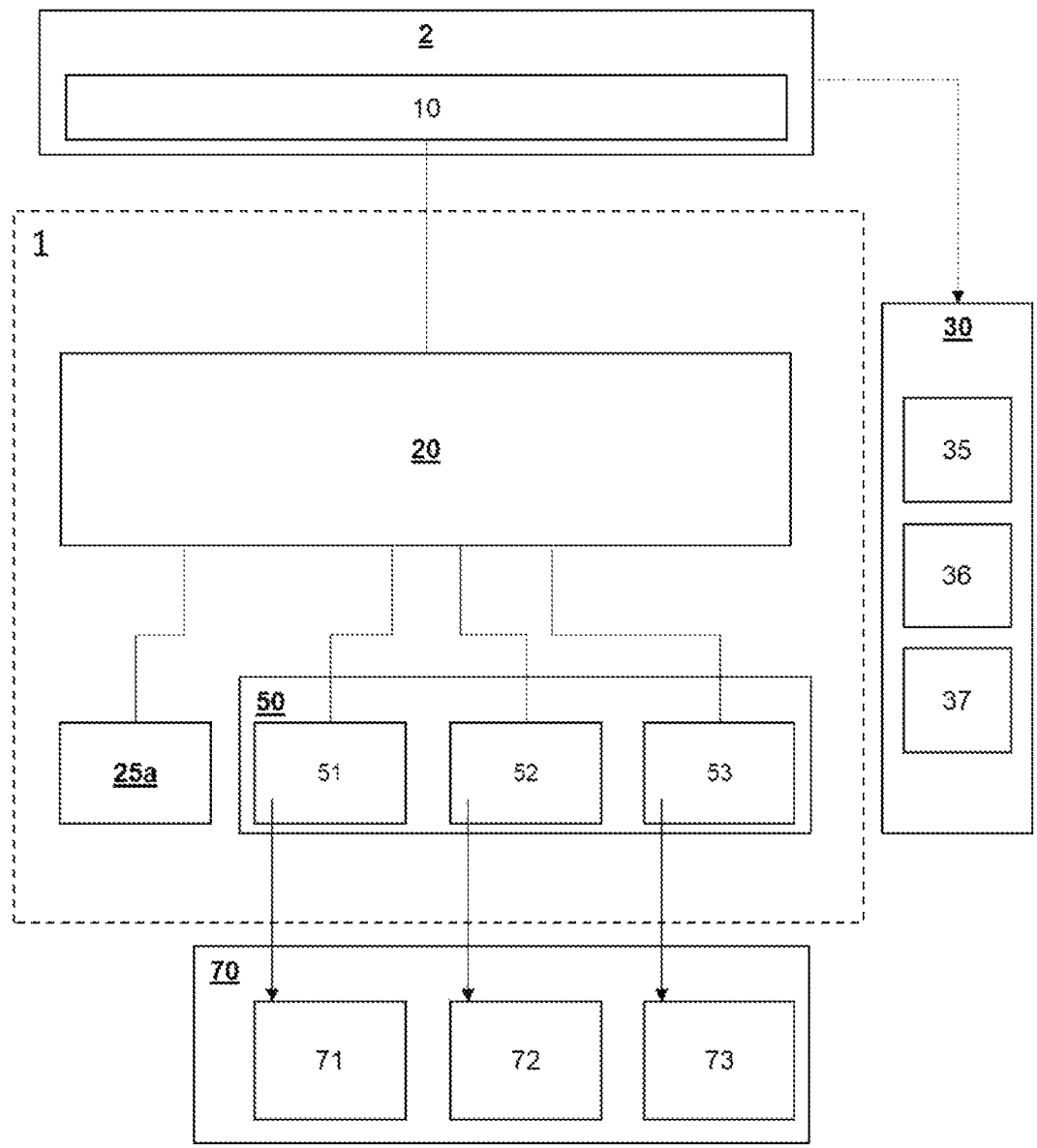
FIG. 1 represents a diagram of a computer system for managing the data streams according to the invention.

In the figures, the flowcharts and the block diagrams illustrate the architecture, functionality, and operation of possible implementations of systems, methods and computer program products according to various embodiments of the present invention. In this regard, each block in the flowcharts or block diagrams can represent a system, a device, a module or a code, which comprises one or several executable instructions for implementing the specified logical function(s). In some implementations, the functions associated with the blocks can appear in a different order than the one indicated in the figures. For example, two blocks successively shown can, in fact, be executed substantially simultaneously, or the blocks can sometimes be executed in the reverse order, depending on the functionality involved. Each block of the schematic diagrams and/or of the flowchart, and combinations of blocks in the schematic diagrams and/or the flowchart, can be implemented by special hardware systems that execute the specified functions or acts or perform combinations of special hardware and computer instructions.

DESCRIPTION OF THE INVENTION

In the remainder of the description, the expression "management of the authorizations" corresponds, within the meaning of the invention, to the ability to manage, based on predetermined rules, the access to the intensive computing solutions on the one hand and the user rights on these solutions such as reading, writing, copy, execution, modification and full control.

The term "aggregated" or "aggregation" can correspond to the fact of presenting data coming from many different origins in a single location. The aggregation can also correspond to the creation of a new data from at least two different data. For example, this can correspond to a total duration before completion of a computing project, said total duration taking into account the duration before completion on a first intensive computing server and the duration before completion on a second intensive computing server, the two durations are not simply added together.

The expression "aggregated interface" or "aggregation interface" can designate within the meaning of the invention a graphical man-machine interface benefiting from a method for collecting and aggregating information coming from the intensive computing solutions. Furthermore, an aggregated interface can benefit from the organization of the information according to one of the characteristics of the screen displaying said interface.

The term "Data(s)" corresponds to one or several files or one or several parameter values. The parameter values being intended for the intensive computing solutions, generated by intensive computing solutions or even generated from data of the intensive computing solutions. The data within the meaning of the invention can particularly correspond to computing input files accessible and processable by several intensive computing solutions, computing results accessible and processable by several intensive computing solutions, duration data before completion of the computing, values derived from energy consumption measurements, resource use measurement values (network bandwidth, storage inputs/outputs, memory, CPU, GPU, etc.), billing information, system parameter values particularly systems implementing the intensive computing solutions or even parameter values of hardware infrastructures hosting the intensive computing solutions.

The expression "intensive computing solution" preferably corresponds to computer infrastructures capable of executing intensive or high performance computing such as: High Performance Parallel Computing, Artificial Intelligence, Deep Learning, quantum computing and quantum computing simulation.

The term "microservice" corresponds to an application chain generally including a plurality of applications capable of executing one or several tasks. The microservices can be linked together through APIs such as an API REST. The presence within the framework of the invention of microservices allows conferring a strong modularity and scalability to the solution, in particular with regard to the involvement of potentially very different intensive computing solutions.

The term "portlet" can designate connectable user interface software components that are managed and displayed in a Web portal. A portal page can be displayed as a collection of non-overlapping portlet windows, where each portlet window displays a portlet. Accordingly, a portlet (or collection of portlets) looks like a Web-based application that is hosted in a portal.

The expression "Web portal" or more simply "Portal" can designate an access tool for accessing different types of information and applications via a client system from the resources of the network. A tool for displaying a portal page can be a Web browser. However, a portal can also be integrated into other applications. The portals within the meaning of the invention are advantageously capable of presenting data from several sources such as Web applications in a single aggregated Web or browser interface. Furthermore, a portal provides the possibility of displaying portlets in the aggregated interface. The configuration of the portal can include a portal definition with for example a file including extensible markup language (XML), the portlet definition files for all the portlets associated with the portal, the Java server pages (JSP), the Web application descriptors, images such as the graphics interchange format (GIFs) files, the deployment descriptors, the configuration files, the Java ARchive (JAR) files that contain logic and formatting instructions for the portal application and all the other files needed for a desired portal application.

The term "request" can designate a request for information, generally identified by a "link" on a portal page. A request can be initiated by a "click" on a displayed symbol associated with the "link".

It is meant by "database" a collection of data recorded on a medium accessible by a computer and organized in such a way as to be easily accessible, administered and updated. A database according to the invention can comprise different types of contents in the form of text, images or numbers and can thus correspond to any type of known database such as in particular a relational database, a distributed database or an object-oriented database. The communication with such a database is ensured by a set of programs that constitute the database management system operating in client/server mode, the server receives and analyzes requests issued by the client in a SQL (Structured Language Query) format, adapted to communicate with a database.

The expression "man-machine interface" within the meaning of the invention corresponds to any element allowing a human being to communicate with a particular computer and without this list being exhaustive, a keyboard and means allowing, in response to the orders entered using the keyboard, to display and potentially select elements displayed on the screen using the mouse or a touchpad. Another exemplary embodiment is a touch screen that allows selecting directly on the screen the elements touched by the finger or an object and potentially with the possibility of displaying a virtual keyboard.

The term "client side" can designate activities that can be performed on a client in a client-server network environment. Accordingly, the activities that can be executed can be indicated by the term "on the server side" on a server in a client server network environment.

The term "plurality" within the meaning of the invention corresponds to at least two. Preferably, this can correspond to at least three, more preferably at least five and even more preferably at least ten.

It is meant by "process", "calculate", "execute", "determine", "display", "extract", "compare" or more broadly "executable operation", within the meaning of the invention, an action performed by an device or a processor unless the context indicates otherwise. In this regard, the operations relate to actions and/or processes of a data processing system, for example a computer system or an electronic computer device, which manipulates and transforms the data represented as physical (electronic) quantities in the memories of the computer system or other devices for storing, transmitting or displaying the information. These operations can be based on applications or software.

The terms or expressions "application", "software", "program code" and "executable code" mean any expression, code or notation, of a set of instructions intended to cause a data processing to perform a particular function directly or indirectly (e.g. after an operation of conversion to another code). The program code examples can include, but are not limited to, a subroutine, a function, an executable application, a source code, an object code, a library and/or any other sequence of instructions designed for the execution on a computer system.

It is meant by "processor", within the meaning of the invention, at least one hardware circuit configured to execute operations according to instructions contained in a code. The hardware circuit can be an integrated circuit. Examples of a processor comprise, but are not limited to, a central processing unit, a graphic processor, an application-specific integrated circuit (ASIC), and a programmable logic circuit.

It is meant by "coupled", within the meaning of the invention, connected, directly or indirectly with one or several intermediate elements. Two elements can be coupled mechanically, electrically or linked by a communication channel.

In the remainder of the description, the same references are used to designate the same elements.

As has been mentioned, there are many intensive computing solutions available and accessible to the occasional users. However, there is no platform for unifying the access to a plurality of intensive computing solutions in a transparent, homogeneous and secure manner.

The inventors have therefore proposed a computer system 1 for managing data streams allowing, via the use of a plurality of microservices, unified governance and an aggregated interface, for the access to a variety of services from third-party providers of intensive computing solutions.

The intensive computing solutions are generally programmed to organize and plan intensive computing operations and to monitor the progress of this intensive computing over time. A large amount of data, whether it is data obtained when achieving the intensive computing or when monitoring the achievement of this intensive computing, is generated and can be caused to be exchanged. Unified governance of a plurality of intensive computing solutions will benefit from the establishment of a management of the data streams to allow decoupling the exchanges between the user client(s) and the intensive computing solutions, particularly their possible schedulers.

For that purpose, the inventors propose the use of a proxy microservice, positioned between an aggregated interface and computing microservices and configured to manage data streams so as in particular to decouple the requests of the user clients from the requests made to the intensive computing solutions.

Thus, the methods and systems developed by the inventors allow coupling the access to updated information with a centralization of the information and an ergonomics adapted to each field of intensive computing.

The invention therefore relates to a method 1000 for managing the data streams accessible at an aggregated interface 10 of a user client 2.

Particularly, as illustrated in FIG. 1 and as will be described later, the method for managing the accessible data streams and particularly the unified governance can be ensured by a computer system 1 for managing the data streams including: a proxy microservice 20, at least one computing microservice 50, 51, 52, 53 for each of the intensive computing solutions and at least one database 25a configured to store execution data for intensive computing operations. The computing microservices 50 within the framework of the present invention are for example selected among: a microservice 51 linked to a high performance computing server 71, a microservice 52 linked to a server dedicated to supervised or unsupervised learning 72, and "n" microservice 53 linked to a server dedicated to quantum computing 73, particularly to quantum computing simulations.

The management of the data streams will allow, thanks to the method according to the invention, managing the expectations of a multitude of users while remaining compatible with the responsiveness of an intensive computing scheduler.

Indeed, a method 1000 for managing data streams according to the invention is advantageously implemented within the framework of unified governance of a plurality of intensive computing solutions 70. The intensive computing solutions 70 within the framework of the present invention are for example selected among: a high performance computing server 71, a server dedicated to supervised or unsupervised learning 72 and a server dedicated to quantum computing 73, particularly to quantum computing simulations. Particularly, a server dedicated to supervised or unsupervised learning 72 can be a server dedicated to supervised or unsupervised deep learning. Preferably, the intensive computing solutions for which the authorization management is implemented include at least two of the solutions listed above, more preferably at least three of the solutions listed above.

Thus, the method for managing the data streams is implemented at least partly by a computer system for managing the data streams, that is to say that the method can for example be implemented by the computer system for managing the data streams in combination with at least one user client, preferably several user clients and intensive computing solutions.

Furthermore, the aggregated interface 10 is composed of a plurality of portlets 11, 12, 13, each portlet being associated with an intensive computing solution 71, 72, 73.

Figure 2:
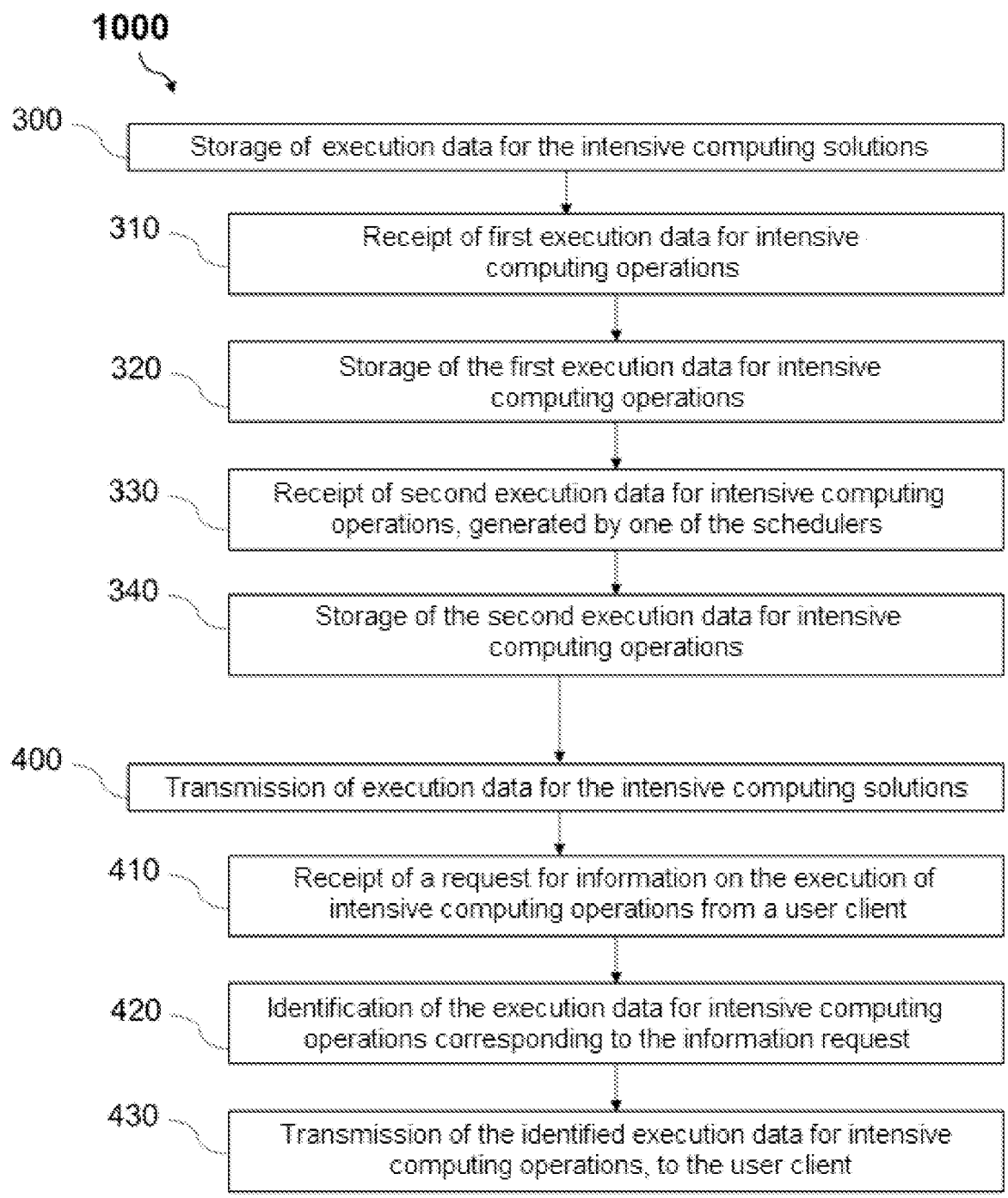
FIG. 2 represents a schematic illustration of a method for managing the data streams according to the invention.

As illustrated in FIG. 2, a method 1000 for managing the data streams according to the invention includes the steps of storing 300 execution data for the intensive computing solutions 70 and transmitting 400 execution data for the intensive computing solutions.

Furthermore, a method 1000 for managing the data streams according to the invention may include steps of storing 500 instruction data for intensive computing operations and transmitting 600 instruction data for intensive computing operations, to the intensive computing solutions.

The method for managing the data streams according to the invention can also advantageously integrate steps of submitting jobs, monitoring the jobs, suspending and resuming the jobs and modifying the parameters of the job.

Furthermore, as will be detailed later, the method for managing the data streams according to the invention can advantageously integrate a procedure 100 for managing an authorization and a procedure 200 for generating an aggregated data.

Advantageously, a method 1000 for managing the data streams according to the invention can include a step of modifying the aggregated interface as a function of the authorizations granted to the user client. Indeed, once identified, the user client will be able to benefit from new functionalities and therefore from an aggregated interface consistent with these functionalities.

As will be described in detail later, the present invention allows a management of the data streams within the framework of unified governance of a plurality of intensive computing solutions. The data whose stream will have to be managed are information exchanged with the scheduler(s), or even business data generated and shared by different computing solutions. The data whose stream will have to be managed are particularly execution data for the intensive computing solutions 70.

The execution data for the intensive computing solutions 70 can for example correspond to:

Computing results accessible and processable by several computing microservices:

This allows the user client 2 to have computing results processed by the intensive computing solutions.

Energy consumption measurements of the intensive computing solutions:

This allows the user client 2 to have a data summarizing the expected or actual energy consumption of the intensive computing planned on an intensive computing solution.

Resource use measurements (network bandwidth, storage inputs-outputs, memory, CPU, GPU . . . ):

Thus, instead of having resource use data according to the different intensive computing solutions.

Use index data for the intensive computing processes:

Beyond the resource use measurement, it is advantageous to be able to receive a use index value for the intensive computing processes for each of the intensive computing solutions used. For example, this index value can be calculated from the use durations as well as the capacities used. This use index value for the intensive computing processes can for example be then used to calculate a use cost of each of the intensive computing processes.

Duration data before completion of the computing:

for example, a duration value reflecting the end of the operations for each of the intensive computing solutions.

Preferably, the execution data for the intensive computing solutions 70 is selected among:

Computing results accessible and processable by several computing microservices;

Energy consumption measurements of the intensive computing solutions;

Resource use measurements;

Use index data for the intensive computing processes; and

Data duration before completion of the computing.

Preferably, the execution data for the intensive computing solutions 70 is selected among:

Computing results accessible and processable by several computing microservices;

Energy consumption measurements; and

Resource use measurements.

A method 1000 for managing the data streams according to the present invention includes a storage 300 of execution data for the intensive computing solutions 70. This storage step is detailed in FIG. 2 and in FIG. 3.

A stream management method 1000 according to the present invention includes a receipt 310 of first execution data for intensive computing operations. The receipt is made for example by a first computing microservice 51. Particularly, this step can correspond to the receipt of a message Md1a coming from a first intensive computing solution 71. These data have been generated by a first intensive computing solution. Furthermore, they have been preferably sent by a scheduler of the first intensive computing solution 71.

Figure 3:
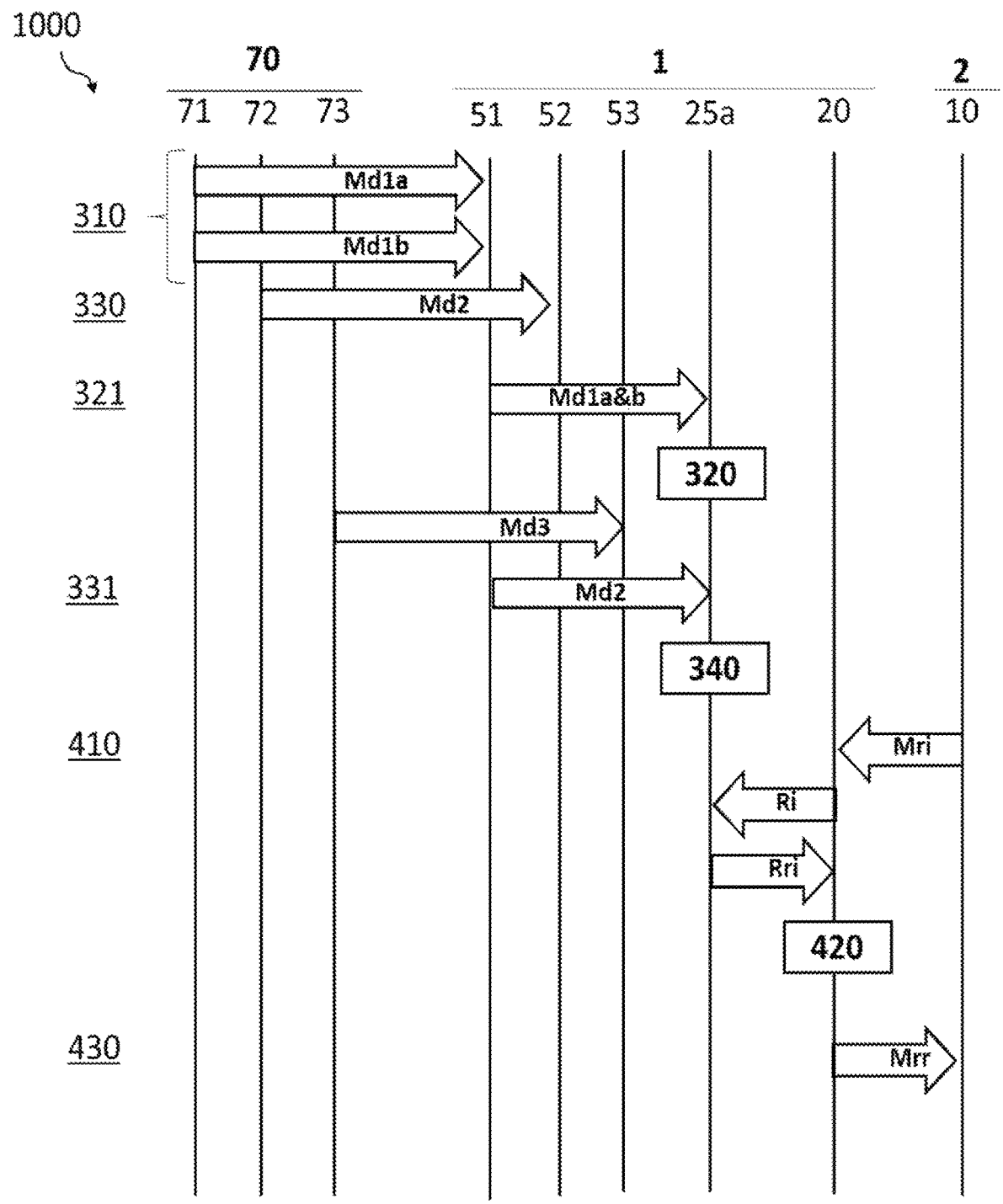
FIG. 3 represents a schematic illustration of a method for managing the data streams according to one embodiment of the invention.

As illustrated in FIG. 3, the receipt 310 of first execution data for intensive computing operations may include the receipt of several data messages Md1a, Md1b coming from a first intensive computing solution 71.

Furthermore, as illustrated in FIG. 3, each intensive computing solution can have a transmission frequency of execution data for intensive computing operations which is specific thereto and different from the transmission frequencies for the other intensive computing solutions. One of the advantages of the present invention is precisely to be able to erase these differences for the end user.

As illustrated in FIG. 3, it is a first computing microservice 51 that will receive one or several messages Md1a, Md1b coming from a first intensive computing solution 71. A message Md1a can further include identification data of the user client 2 and/or of an intensive computing project. A message Md1a, Md1b can then be transmitted to the proxy microservice 20.

A stream management method 1000 according to the present invention includes a storage 320 of the first execution data for intensive computing operations. This storage is preferably carried out on the at least one database 25a.

The database 25a is advantageously stored in a data memory of a computer device, such as by way of non-limiting example a computer server. The data memory can advantageously include a non-erasable section, which is physically isolated or simply arranged so that a write or erase access is prohibited. The data memory can further be arranged to record the intensive computing operations performed by the intensive computing solutions.

As illustrated in FIG. 3, the storage 320 of the first execution data for intensive computing operations can correspond to the storage of data contained in data messages Md1a and Md1b including several execution data and sent 321 by the first computing microservices 51. Thus, the first execution data for intensive computing operations Md1 a&b could correspond to the data of several messages Md1a, Md1b coming from a first intensive computing solution.

A stream management method 1000 according to the present invention includes a receipt 330 of second execution data for intensive computing operations. This receipt is preferably made by a second computing microservice 52. As illustrated in FIG. 3, this receipt 330 can take place before the storage 320 of the first data.

These data have been generated by a second intensive computing solution. Furthermore, they have been preferably sent by a scheduler of the second intensive computing solution. This intensive computing solution is preferably different from the first solution and advantageously concerns another category of intensive computing. As above, the execution data for intensive computing operations can be contained in one or several messages Md2 coming 331 from the second intensive computing solution.

A stream management method 1000 according to the present invention includes a storage 340 of the second execution data for intensive computing operations. This storage is preferably carried out on the at least one database 25a. Preferably, only the most recent execution data for intensive computing operations are stored. Thus, there is no storage of all the data history but only of the most recent execution data for intensive computing operations.

Furthermore, the computing microservice can occasionally record information provided by the server of the intensive computing solution on a logging library and store this information in a database. Alternatively, it is the proxy microservice 20 that can occasionally record information provided by the server of an intensive computing solution on a logging library and store this information in a database.

Alternatively, the computing microservice can query a server hosting the intensive computing solution in order to obtain the last requested value.

Advantageously, each of the computing microservices 51, 52, 53 includes a data memory capable of storing last values of a plurality of parameters relating to the intensive computing solution to which it is linked.

In FIG. 3, only the storages of the first and second execution data for intensive computing operations are represented, however, the method may include the receipt of data coming from other computing solutions, for example in the form of a message Md3 and their storage.

A method 1000 for managing the data streams according to the present invention also includes a transmission 400 of execution data for intensive computing solutions. This transmission step is detailed in FIG. 2 and in FIG. 3. Preferably, the transmission frequencies of data for the intensive computing solutions are different depending on the solutions and are lower than the transmission frequencies of the proxy microservice at the portlets.

A stream management method 1000 according to the present invention includes a receipt 410 of a request for information on the execution of intensive computing operations. The receipt is made for example by the proxy microservice 20. Particularly, this step can correspond to the receipt of a message Mri coming from an aggregated interface 10 of a user client 2.

The method can then include the sending of an information request message Ri by the proxy microservice 20 to the database 25a and then to a receipt of a response message Rri including execution data for intensive computing operations corresponding to the information request.

Thus, a stream management method 1000 according to the present invention includes an identification 420 of the execution data for intensive computing operations corresponding to the information request. This identification can be carried out based on the information contained in at least one database 25a.

A stream management method 1000 according to the present invention then includes a transmission 430 of the identified execution data for intensive computing operations, to the user client 2. The transmission is made for example by the proxy microservice 20. Particularly, this step can correspond to the transmission, to the aggregated interface 10 of a user client 2, of a message Mrr coming from the proxy microservice 20. Advantageously, the aggregated interface 10 is composed of a plurality of portlets 11, 12, 13, each portlet being associated with an intensive computing solution 71, 72, 73 and the transmission 400 of execution data for the intensive computing solutions includes a transmission of the execution data for intensive computing operations of an intensive computing solution 71 given to the portlet 11 associated therewith.

Figure 4:
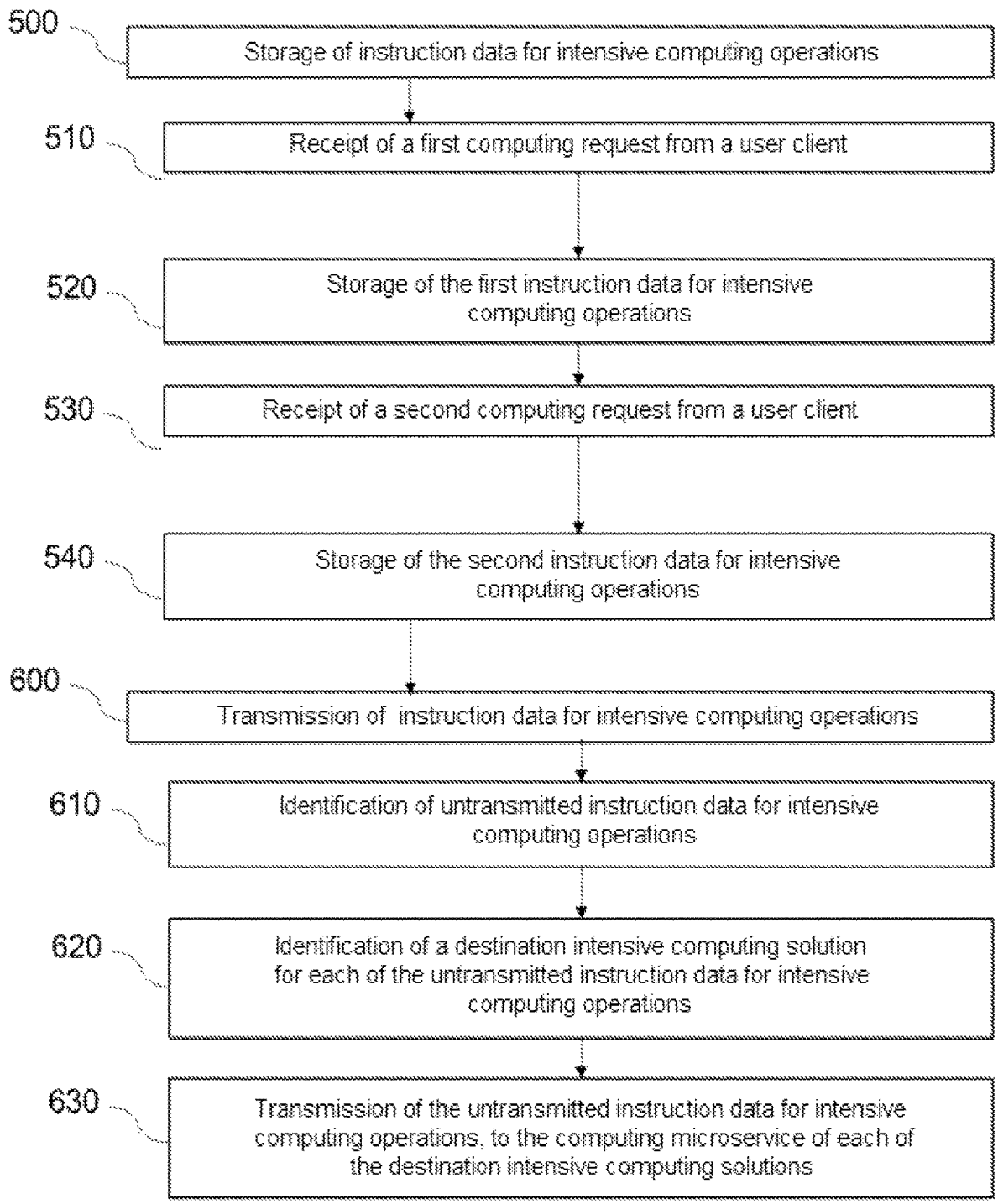
FIG. 4 represents a schematic illustration of a step of storing instruction data for intensive computing operations and a step of transmitting instruction data for intensive computing operations of a method for managing the data streams according to the invention.

As illustrated in FIG. 4, a method 1000 for managing the data streams according to the present invention may also include a storage 500 of instruction data for intensive computing operations and a transmission 600 of instruction data for intensive computing operations. This allows the method according to the invention to implement a management of multiple requests for instructions intended for the intensive computing solutions 70. Particularly, such an embodiment allows a management of the data streams and particularly of the requests when these streams come from multiple user clients and concern several intensive computing solutions.

As illustrated in FIG. 4, a method according to the invention can include a receipt 510 of a first computing request from a user client 2. This receipt is usually carried out by the proxy microservice 20. Furthermore, this first computing request includes first instruction data for intensive computing operations.

The method according to the invention can then include a storage 520 of the first instruction data for intensive computing operations. This storage is done particularly on at least one database 25b.

The method according to the invention includes a receipt 530 of a second computing request from the user client 2. As for the first computing request, this receipt is usually carried out by the proxy microservice 20. Furthermore, this second computing request includes second instruction data for intensive computing operations. Advantageously, these second instruction data for intensive computing operation concern an intensive computing solution 72 different from the intensive computing solution 71 concerned by the first instruction data for intensive computing operations.

As above, these second instruction data for intensive computing operations can be stored 540 on the at least one database 25b.

Thus, a storage 500 of instruction data for intensive computing operations allows storing on at least one database 25b a plurality of instruction data for intensive computing operations that may concern one, preferably several, different intensive computing solutions.

Once several instruction data for intensive computing operations are stored, the method 1000 according to the invention may include an identification 610 of untransmitted instruction data for intensive computing operations. This identification can be usually performed by the proxy microservice 20 and based on the data stored on the at least one database 25b.

Furthermore, the method 1000 according to the invention may include an identification 620 of a destination intensive computing solution for each of the instruction data for untransmitted intensive computing operations. Indeed, one of the advantages of a procedure 100 according to the invention is to be able to propose unified governance of a plurality of different intensive computing solutions. Here, it allows for example, thanks to the proxy microservice 20, identifying the intensive computing solutions concerned by each of the untransmitted instruction data for intensive computing operations.

Furthermore, the method 1000 according to the invention could include a transmission 630, preferably by the proxy microservice 20, of the instruction data for untransmitted intensive computing operations, to the computing microservice 51, 52, 53 of each of the destination intensive computing solutions.

Advantageously, each of the computing microservices 51, 52, 53 is configured to communicate with the intensive computing solutions and particularly their schedulers. Thus, they will be able to send the untransmitted instruction data for intensive computing operations, to the computing solutions. Advantageously, this sending could include untransmitted instruction data for intensive computing operations, coming from a plurality of different user clients.

There is therefore a management of the data streams that allows regulating the communication with the intensive computing solutions.

Figure 5:
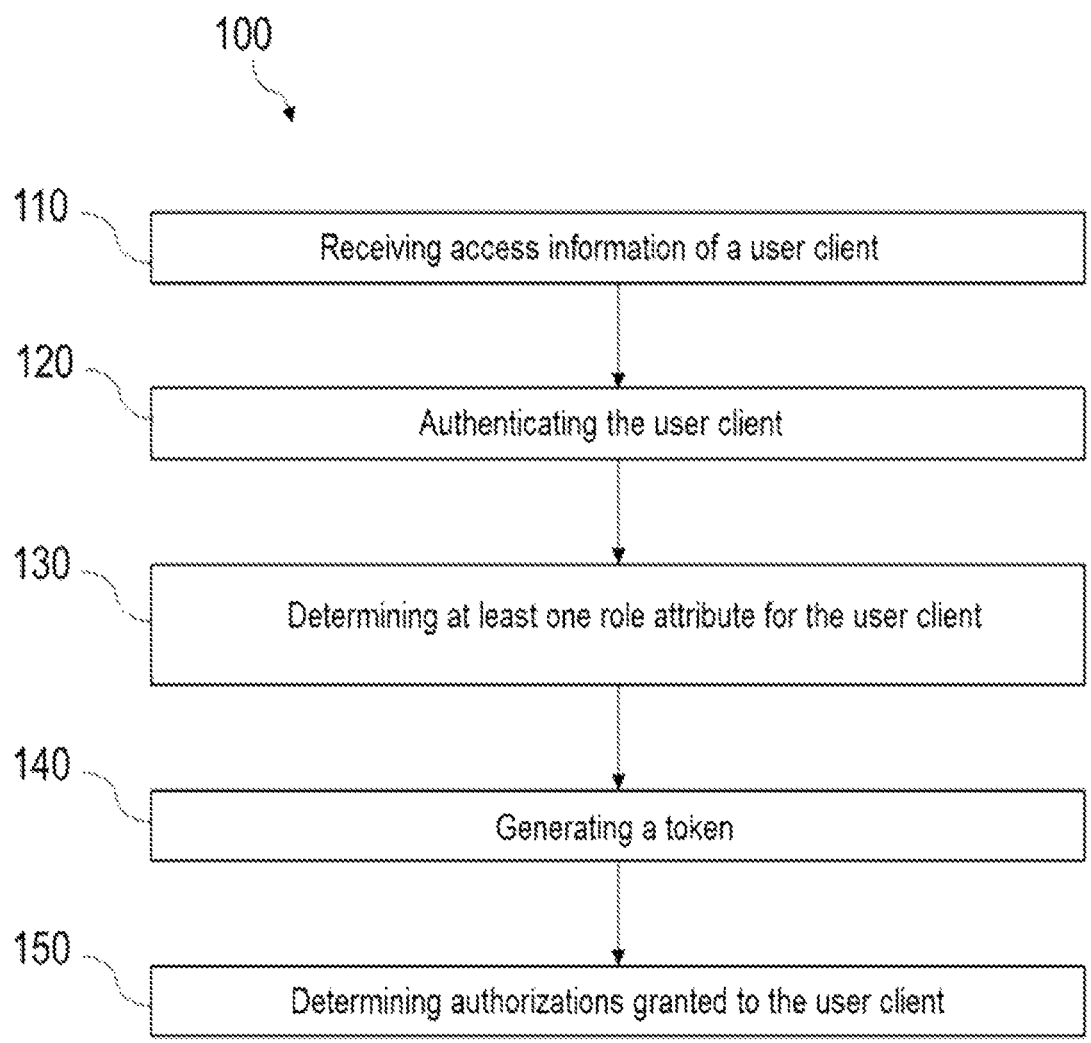
FIG. 5 represents a schematic illustration of an authorization management procedure according to one embodiment of the invention.

As illustrated in FIG. 5, a method 100 for managing the data streams according to the invention can also include a procedure 100 for managing authorizations granted to a user client 2. Within the framework of this authorization management procedure 100, the computer system 1 for managing the data streams can further include a token security microservice 30, at least one security repository 35, 36, 37 and at least one authorization repository 40.

Such an authorization management procedure 100 according to the invention includes the steps of receiving 110 access information of a user client 2, authenticating 120 the user client 2, determining 130 at least one role attribute for the user client 2, generating 140 a token and determining 150 authorizations granted to the user client 2.

Furthermore, an authorization management procedure 100 according to the invention can include steps of submitting jobs, monitoring jobs, suspending and resuming jobs and modifying the parameters of the job.

Advantageously, a management procedure 100 according to the invention can include a step of modifying the aggregated interface as a function of authorizations granted to the user client. Indeed, once identified, the user client will be able to benefit from new functionalities and therefore from an aggregated interface consistent with these functionalities.

Thus, the authorization management procedure 100 according to the present invention includes a receipt 110 of access information of a user client 2.

Preferably, at least part of the access information is generated at the aggregated interface 10 of the user client 2.

Particularly, the receipt can be made by the token security microservice 30. However, preferably, this information is transferred from the user client directly or indirectly to the proxy microservice 20, the proxy microservice 20 then transfers this access information, modified or not, to the token security microservice 30.

The access information can for example take the form of a message including identification data of the user client 2.

Thus, the authorization management procedure 100 according to the present invention includes an authentication 120 of the user client 2.

The authentication can for example be performed by any module capable of implementing a Single Sign On (SSO) protocol. Different protocols can be used to perform the authentication of the user client 2. Preferably, the authentication 120 of the user client 2 is done according to a protocol selected among a known protocol OAuth allowing a third-party application to access a Web service, and SAML (Security assertion markup language) concerning a computer standard defining a protocol for exchanging information related to security and allowing the Single Sign On of a user.

Advantageously, the authentication 120 of the user client 2 is not performed by the proxy microservice 20. More preferably, the authentication is performed by a token security microservice 30. There is thus a delegation, by the proxy microservice 20, from the identification, authentication and role assignment control to the token security microservice 30.

Particularly, the token security microservice 30 is configured to access a plurality of directories or security repositories 35, 36, 37, preferably at least LDAP (Lightweight Directory Access Protocol) type directories, a service for storing and managing an information system such as the known solution Active Directory® and an authentication system such as the known authentication protocol Kerberos®. The security repository 35, 36, 37 can correspond to a medium for storing keys and/or tokens, such as a database, a data file or any other system for a secure storage in a memory. It is generally a secure medium for storing the names, passwords, roles and authorizations of the users. Preferably, it includes a role matrix and a subscription matrix.

Furthermore, the token security microservice 30 advantageously implements an OAuth-type and particularly OAuth 2.0-type protocol.

Preferably, although the token security microservice 30 forms part of a computer system 1 for managing the data streams according to the invention, it is advantageously hosted on one or several different computer devices (e.g. servers), distinct from the computer device(s) hosting the proxy microservice 20 and/or the computing microservices 50, 51, 52, 53.

There are many possible variants in the implementation of the authentication 120 of the user client 2. Advantageously, the token security microservice 30 can provide a very wide variety of authentication protocols but is not able to provide optimized fine-grained security controls. To overcome this situation, the inventors have proposed a delegation only of a control subset to the token security microservice 30. If the token security microservice 30 cannot provide sufficiently fine security controls for intensive computing solutions, these controls will be entrusted to the computing microservices.

Furthermore, the proxy microservice can record information provided by the user client on a logging library and store this information in a database.

The authentication 120 of the user client 2 can also correspond to an authentication of a developer client. Advantageously, the token security microservice 30 will be invoked each time a third-party contacts the proxy microservice and requires an authentication.

Thus, the authorization management procedure 100 according to the present invention includes a determination 130 of at least one role attribute for the user client 2.

Preferably, the determination 130 is performed by the token security microservice 30. The determination 130 of at least one role attribute for the user client 2 is for example performed from the access command information and data stored in a security repository 35, 36, 37.

Once the user client has been authenticated, the method according to the invention will allow the generation of a token allowing a temporary access to resources managed by the computing microservices. Particularly, the method according to the invention is based on authorizations controlled via previously determined roles or role attributes.

Based on predetermined rules, a role is selected for a user client 2 and registered in an identification token of the user client.

The token can for example take the form of a JWT token (JSON Web Token). It contains the requests on the identity of the authenticated user client. Alternatively, the method according to the invention can implement a PASETO (Platform-Agnostic Security Tokens) type token, a Branca-type token or even a Macaroons-type token (Cookies with contextual warnings for the decentralized authorization in the cloud according to Google®).

Preferably, the authentication 120 and the determination 130 of at least one role attribute for the user client 2 are performed in accordance with the OAuth 2.0 protocol.

Particularly, the token security microservice 30 processes a message from the proxy microservice 20 and extracts the access request. The token security microservice 30 then compiles the list of the access rights granted for the user client 2 and requests a security token for the granted rights.

A token is then generated and transmitted to the proxy microservice 20 which in turn transmits it to the user client.

Thus, the authorization management procedure 100 according to the present invention includes a generation 140 of a token. Particularly, this generated token allows an access to all the intensive computing solutions accessible (i.e. for which the user client has the authorizations) to said user client 2 based on the at least one determined role attribute.

However, this token does not generally allow finely defining the authorizations granted to the user client 2 for on one or several intensive computing solutions. More preferably, the generated token includes access rights to one or several intensive computing solutions as well as a role characteristic of the user client 2.

Thus, the authorization management procedure 100 according to the present invention then includes a determination 150 of authorizations granted to the user client 2.

Advantageously, the authorization determination is based on the at least one determined role attribute and data contained in an authorization repository 40.

The authorization determination 150 can for example be performed by the proxy microservice or a computing microservice.

Preferably, the authorization determination 150 is performed by at least one computing microservice 50, 51, 52, 53.

For example, an intensive computing solution can have more than 50 functionalities that need to be multiplied by a distribution based on the user's roles and on the solutions. Thus, it is generally several hundred authorizations that must be managed. Within the framework of the invention, a computing microservice is therefore advantageously coupled with an authorization catalog or an authorization repository 40.

This authorization catalog or repository 40 can be implemented as a table in the database of the backend (either in its own microservice or in a dedicated microservice).

Thus, at least part of the access control and authorization management is implemented at each of the computing microservices.

Thanks to this, it will be possible to meet the very fine-grained authorization needs of the intensive computing solutions while ensuring a high level of security provided by the use of authentication tokens.

Figure 6:
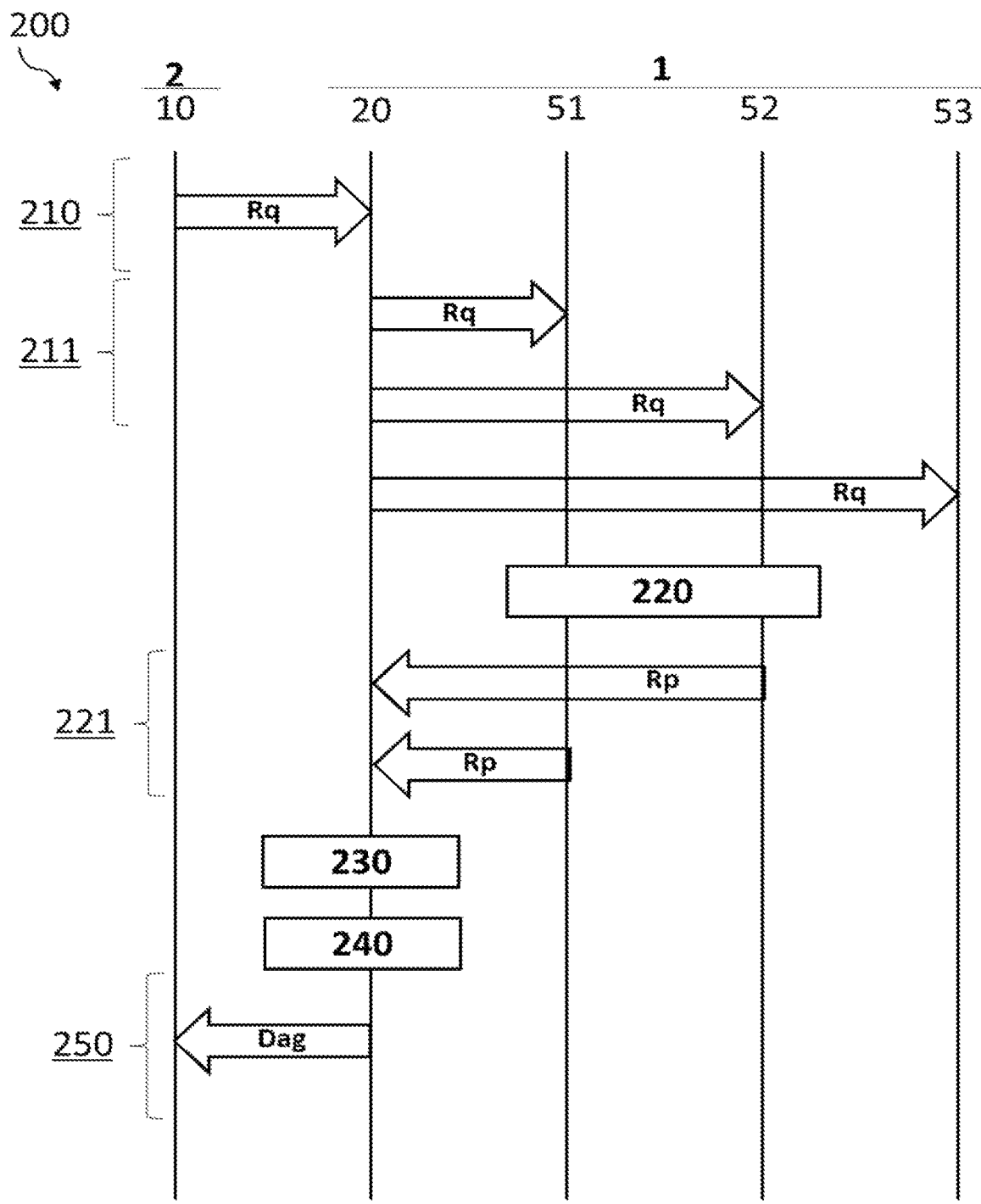
FIG. 6 represents a schematic illustration of a procedure for generating an aggregated data according to one embodiment of the invention.

As illustrated in FIG. 6, a method 1000 for managing the data streams according to the invention may also include a procedure 200 for generating an aggregate data.

As illustrated in FIG. 6, a procedure 200 for generating an aggregated data according to the invention includes the steps of receiving 210 access command information of a user client, determining 220 data accessible to the user client 2, determining 230 data to be aggregated, generating 240 an aggregated data from the data to be aggregated and transmitting 250 the aggregated data to the aggregated interface 10 of the user client 2.

Furthermore, a procedure 200 for generating an aggregated data according to the invention can include steps of determining redundant data from the accessible data determined by each of the computing and transmitting a single copy of each of the redundant data, by the proxy microservice, to the aggregated interface 10 of the client user 2.

Advantageously, a procedure 200 for generating an aggregated data according to the invention can include a step of modifying the aggregated interface as a function of the authorizations granted to the user client. Indeed, once identified, the client user will be able to benefit from new functionalities and therefore from an aggregated interface consistent with these functionalities.

A procedure 200 for generating an aggregated data according to the present invention includes a receipt 210 of access command information. Particularly, this step can correspond to the receipt of a message coming from an aggregated interface 10, and therefore from the user client 2.

As illustrated in FIG. 6, it is the proxy microservice 20 that will receive a message Rq coming from the user client 2 and generated via the aggregated interface 10. Indeed, preferably, at least one part of the access command information is generated at the aggregate interface 10 of the client user 2.

The Rq message could also include identification data of the client user 2. This Rq message may be transmitted to the computing microservices 51, 52, 53.

Thus, the proxy microservice 20 can receive a request from an aggregated interface 10 running on a user client 2 and it can select one or several of the computing microservices 51, 52, 53 to operate on the request.

The proxy microservice 20 can provide the possibility of making 211 several parallel requests Rq to several targets (i.e. computing microservices 51, 52, 53) and extracting a common set of data from the outputs returned by the computing microservices 51, 52, 53.

The one or several of the computing microservices 51, 52, 53 can analyze the request and identify a data they have and for which an access is required.

Particularly, a method 200 for generating an aggregated data according to the present invention includes a determination 220 of data accessible to the user client 2.

Such a determination can be performed by each of the computing microservices 51, 52, 53. It is based at least partly on the access command information received by the proxy microservice 20.

There are many possible variants in the implementation of the determination 220 of data accessible to the user client 2. Advantageously, each of the computing microservices 51, 52, 53 includes a data memory capable of storing last values of a plurality of parameters relating to the intensive computing solution to which it is linked. Alternatively, the computing microservice can query a server hosting the intensive computing solution in order to obtain the last requested value.

Furthermore, a computing microservice 51, 52, 53 can occasionally record information provided by the server of the intensive computing solution on a logging library and store this information in a database. Alternatively, it is the proxy microservice 20 that can occasionally record information provided by the server of the intensive computing solution on a logging library and store this information in a database.

Furthermore, the determination of the accessible data can take into account an authentication 120 of the user client 2, for example via a token security microservice 30, particularly in connection with a security repository 35, 36, 37, and at least one authorization repository 40 as will be described below, in particular in connection with FIG. 5.

A possibly accessible data to be aggregated can for example be selected among:

Computing input files accessible and processable by several intensive computing solutions:

This allows the user client 2 to have a view aggregating the computing input files that are processable by all the intensive computing solutions and thus comprehend the entirety of his activity.

Computing results accessible and processable by several computing microservices:

This allows the user client 2 to have a view aggregating the computing results processed by all the intensive computing solutions and thus comprehend the entirety of the accessible results of his activity.

Energy consumption measurements of the intensive computing solutions:

This allows the user client 2 to have a data summarizing the expected or actual energy consumption of the intensive computing planned and thus comprehend the entirety of the consumption of his activity.

Resource use measurements (network bandwidth, storage inputs-outputs, memory, CPU, GPU . . . ):

Thus, instead of having data scattered within the different intensive computing solutions, the user client 2 receives an aggregated data of the use of the resources associated with its intensive computing.

System parameters:

Thus, the user client 2 receives an aggregated data of the system parameters of the intensive computing solutions used.

Descriptions of the hardware infrastructures:

Thus, the user client 2 receives an aggregated data of the descriptions of the hardware infrastructures of the intensive computing solutions used.

Use index data for the intensive computing processes:

Beyond the resource use measurement, it is advantageous to be able to receive a use index value for the intensive computing processes aggregating data coming from the different computing solutions used. For example, this index value can be calculated from the use durations as well as the capacities used. This use index value for the intensive computing processes can for example be then used to calculate a use cost of the intensive computing processes and establish a common billing.

Duration data before completion of the computing:

For example, if a problem is divided between several intensive computing solutions, then an aggregated time is proposed reflecting the end of the operations for each of the servers and making it possible to obtain the full expected results.

Preferably, the aggregated data is selected among:
Computing results accessible and processable by several computing microservices;
Energy consumption measurements of the intensive computing solutions;
Resource use measurements;
Use index data for the intensive computing processes; and
Duration data before completion of the computing.

More preferably, the aggregated data is selected among:
Computing results accessible and processable by several computing microservices;
Energy consumption measurements; and
Resource use measurements.

More preferably, the aggregated data corresponds to use index data for the intensive computing processes.

Once the determination 220 of data accessible to the user client 2 has been performed, the microservices having identified an accessible data will be able to send 221 the data to the proxy microservice 20 in a response message Rp.

As illustrated in FIG. 6, a procedure 200 for generating an aggregated data according to the present invention includes a determination 230 of data to be aggregated.

Preferably, the determination 230 is performed by the proxy microservice 20. The determination 230 of data to be aggregated is for example performed from the accessible data determined by each of the computing microservices 51, 52, 53.

The computing microservices 51, 52, 53 can be invoked with messages of the parallel proxy microservice 20 and the information contained in the response messages Rp can be aggregated (subject to configurable timeouts) as the results return to the proxy microservice 20.

Particularly, the determination 230 of data to be aggregated can implement a keyword repository 21 including correspondences of the categories of accessible data for each of the computing microservices 51, 52, 53.

A procedure 200 for generating an aggregated data according to the present invention includes a generation 240 of an aggregated data from the data to be aggregated. Particularly, this aggregated data is a new data generated from several data each directly or indirectly coming from different intensive computing solutions 71, 72, 73 and not being configured to work together.

This aggregated data is therefore new and allows the user client 2 to inform about a global activity of intensive computing distributed among several independent services.

The proxy microservice 20 can merge and format the output data as needed.

A procedure 200 for generating an aggregated data Dag according to the present invention then includes a transmission 250 of said aggregated data.

As illustrated in FIG. 6, this transmission is preferably performed by the proxy microservice 20 intended for the aggregated interface 10 of the user client 2.

Alternatively, the aggregated data can be transmitted to other microservices such as for example:
a remote visualization server 80, preferably a 3D remote visualization server, and
a management microservice 55.

Advantageously, the aggregated data is transmitted to a remote visualization server 80, and the method 200 according to the invention further includes a step of establishing a communication, preferably secure (e.g. encryption) link, between the user client 2 and the remote visualization server 80, a step of generating representation data from the data aggregated by the remote visualization server 80 and a step of transmitting, by the visualization server 80, the representation data to the user client 2.

A method 1000 for managing the data streams can also be used within the framework of the invention to manage the data redundancy.

Indeed, within the framework of the unified governance of a plurality of intensive computing solutions 70, a removal of the data redundancy, particularly at an aggregated interface 10 can allow smoothing the transfer of information and limiting the errors.

Thus, a method according to the invention can advantageously further include a determination of redundant data. This step can be carried out for example by the proxy microservice 20 and from the accessible data determined by each of the computing microservices. Furthermore, it can include a step of transmitting a single copy of each of the redundant data, by the proxy microservice 20, to the aggregated interface of the user client 2.

Alternatively, the accessible data are transmitted by the proxy microservice 20 to the aggregated interface of the user client 2 and it is the aggregated interface 10 that determines the redundant data.

A method 1000 according to the invention can also include an action command management procedure.

Within the framework of this action command management procedure, the unified governance is ensured by a computer system 1 for managing the data streams further including a token security microservice 30, at least one security repository 35, 36, 37 and at least one authorization repository 40, in that it also includes the following steps:
Receiving, by the proxy microservice 20, an action command generated by the user client 2 and contained in a message coming from the aggregated interface;
Identifying authorized actions, by each of the computing microservices 50, 51, 52, 53, said identification being based at least partly on the action command and on an authorization repository 40;
Generating a transformed action command, by each of the computing microservices 50, 51, 52, 53 having identified an authorized action; and
Transmitting the transformed action command, by each of the computing microservices 50, 51, 52, 53, to the intensive computing solutions 70 concerned.

There are planners or schedulers making it possible, within a set of reserved resources, to distribute the computing tasks between the computing means and to order them. However, these methods and devices only intervene once the computing means have been allocated and do not allow an operator to quickly identify the nodes to be allocated.

Thus, the method according to the invention can also include a task planning step. Indeed, the method according to the invention applies to unified governance of a plurality of intensive computing solutions and it can advantageously include a step during which instructions received by the proxy microservice 20 can be processed so as to organize their optimal execution by the different intensive computing solutions available.

Preferably, the task planning step includes a queue update by each of the computing microservices 50, 51, 52, 53. Particularly, the queue update can take into account a priority index value transmitted by the user client 2.

The task planning step can also include the determination by at least one computing microservice of an amount of resources of a computing solution which will be assigned to a given task.

Furthermore, the task planning step can include the transmission of parameterization data to the intensive computing solution in charge of executing a given task. The parameterization data could for example correspond to one or several input files, or even to a setting specific to the intensive computing solution.

Preferably, the task planning step can also include, during the initiation of a task, the transmission of environment parameterization data such as identifiers of the job directories to be used, the data access paths or the libraries to be used.

Furthermore, the planning step can include:
- a monitoring of the tasks (i.e. jobs) including the determination of the progress of the jobs, the recording of application logs, the recording of result files, the determination of amounts of resources used, the determination of a used credit value,
- a conclusion or suspension of the jobs,
- a resumption of the suspended jobs,
- a modification of the parameters of the jobs.

Preferably, the method according to the invention can include an automated segmentation of a task into a plurality of subtasks assigned to several different intensive computing solutions. Alternatively, a user can, via the aggregated interface, define the distribution of sub-tasks of the same project through several intensive computing solutions. These sub-tasks can be executed in series or in parallel depending on their specificities.

According to another aspect, the invention relates to a computer system 1 for managing the data streams accessible at an aggregated interface 10 of a user client 2 within the framework of unified governance of a plurality of intensive computing solutions 70.

Particularly, a computer system 1 for managing the data streams according to the invention includes a proxy microservice 20, at least one computing microservice 50, 51, 52, 53 for each of the intensive computing solutions and at least one database 25*a*.

Figure 7:
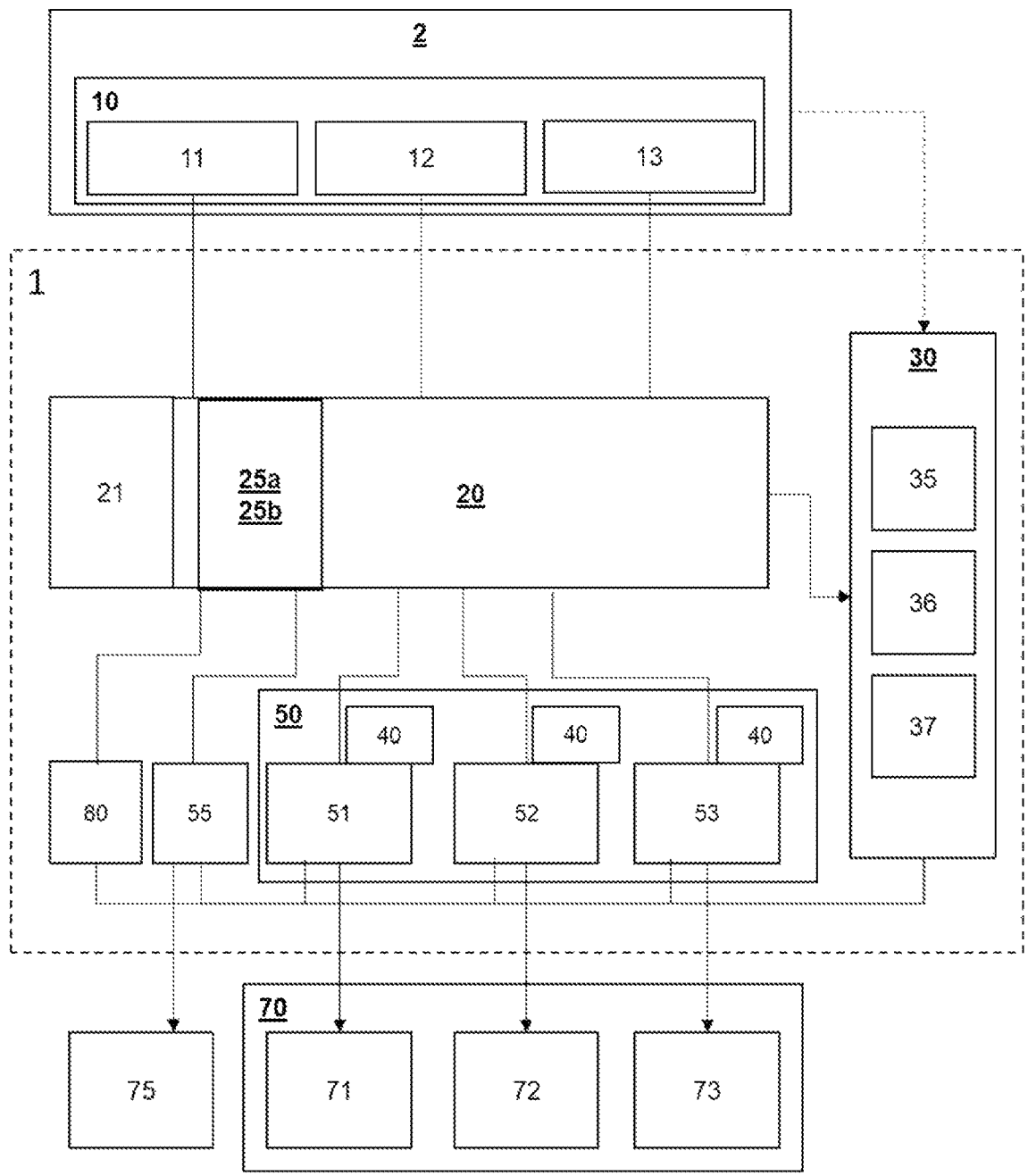
FIG. 7 represents a diagram of a computer system for managing data streams according to one embodiment of the invention Aspects of the present invention are described with reference to flowcharts and/or to block diagrams of methods, apparatuses (systems) and computer program products according to embodiments of the invention.

Furthermore, an exemplary schematic diagram of a computer system 1 for managing the data streams is presented in FIG. 7. A computer system 1 for managing the data streams according to the invention can also include: a token security microservice 30, at least one security repository 35, 36, 37, at least one authorization repository 40, a keyword repository 21 including correspondences of the categories of accessible data for each of the computing microservices 51, 52, 53, a database 25*b* configured to store instruction data for intensive computing operations and a remote visualization server 80, preferably a 3D remote visualization server.

Considering the implementation of the computer system according to the invention, the latter can be hosted by one or several computer servers. It includes particularly a set of microservices such as microservices implemented according to coding protocols of the node.js type or other technologies such as Go, Java/Kotlin/Scala, PHP, Python, Pharo, Elixir, Clojure and Haskell.

The microservices can use configuration entities, such as Json files or XML files or similar representations, as inputs to provide the basic components of the logic, of the transformations, of the mapping and of the management of the keys of the computer system 1.

Each of the services or solutions (token security service, management service, intensive computing solutions) accessible via the proxy microservice 20 can be supported by a corresponding microservice or a chain of microservices providing the logic of implementation of the provided service. Within the framework of the method according to the invention, the microservices can be executed individually and separately in a security zone as microservice(s). Furthermore, as discussed, each of the intensive computing solutions is able to, preferably configured to, generate execution data for intensive computing operations.

Particularly, a computer system 1 for managing the data streams according to the invention includes a proxy microservice 20, configured to receive a request for information on the execution of intensive computing operations from a user client 2. Furthermore, the proxy microservice 20 is configured to identify, on the at least one database 25*a*, execution data for intensive computing operations corresponding to the information request then to transmit identified execution data for intensive computing operations, to the client user 2.

Furthermore, the proxy microservice 20 can be configured to receive a message coming from an aggregated interface. Particularly, the message coming from the aggregated interface can include access command information of a user client 2. This access command information can correspond to parameters for which the user client requests a value or to data that the user client wishes to receive. The message coming from the aggregated interface can further include identifier data of the user client.

The proxy microservice 20 can also be configured to determine data to be aggregated from the accessible data. The determination of the accessible data is preferably performed by the computing microservices, for example via the selection of data stored on a data memory accessible to the computing microservice. The determination of the data to be aggregated could for example be based on data stored on a data memory accessible to the proxy microservice 20.

The proxy microservice 20 can also be configured to generate an aggregated data from the data to be aggregated. This generation can for example be based on predetermined computing formulas stored on a data memory accessible to the proxy microservice 20. For example, based on the accessible data and on an aggregation repository including predetermined computing formulas, the proxy microservice 20 will generate an aggregated data.

The proxy microservice 20 can also be configured to transmit the aggregated data to the aggregated interface 10 of the user client 2.

Furthermore, the proxy microservice 20 can be configured to receive access information of a user client 2. The proxy microservice 20 can be coupled to an add-on that allows taking into account the authorization policies specific to each microservice (business logics), thus allowing a standardization of the exchanges between the proxy microservice 20 and the token security microservice 30. Particularly, this can be used to synchronize user attributes (potentially of very different nature therebetween) in correspondence with the roles specific to the business logics/microservices.

The proxy microservice 20 is advantageously configured to route the incoming requests towards the appropriate microservice as a function of the specified endpoint, of the logic and/or of the arguments.

The computer system 1 for managing the data streams according to the invention includes at least one computing microservice 50, 51, 52, 53 for each of the intensive computing solutions 70, 71, 72, 73. Each of the computing microservices 50, 51, 52, 53 can be linked to its respective intensive computing solution in secure channels such as ssh or mobile shell connections.

Each of the computing microservices 50, 51, 52, 53, is configured to receive first execution data for intensive computing operations generated by a first intensive computation solution and second execution data for intensive computing operations generated by a second intensive computing solution.

Preferably, each of the computing microservices 50, 51, 52, 53, is configured to determine authorizations granted to the user client 2.

Indeed, once a role attribute has been determined, it can be transferred to a microservice which can determine, based on the role attribute value and on the data contained in an authorization repository 40, authorizations granted to the user client 2.

Particularly, the computing microservices 50, 51, 52, 53 coupled to the proxy microservice 20 can be configured to point towards (or be linked) respectively to a particular service or to a particular server. Thus, when a computing microservice is called, a corresponding intensive computing service is selected.

The computer system 1 for managing the data streams according to the invention includes a database 25*a* configured to store execution data for intensive computing operations. Particularly, the at least one database 25*a* will be configured to store first execution data for intensive computing operations and second execution data for intensive computing operations.

Furthermore, the computer system 1 for managing the data streams according to the invention can include a database 25*b* configured to store instruction data for intensive computing operations. Particularly, the at least one database 25*b* will be configured to store first instruction data for intensive computing operations and second instruction data for intensive computing operations.

Like the database 25*a*, the database 25*b* is advantageously stored in a data memory of a computing device such as, by way of non-limiting example, a computer server. The data memory can advantageously include a non-erasable section which is physically isolated or simply arranged so that a write or erase access is prohibited. The data memory can further be arranged to store the instruction data for intensive computing operations.

Particularly, a computer system 1 for managing the data streams according to the invention includes a token security microservice 30, configured to receive the access information of a user client 2, to authenticate the user client 2 and to determine at least a role attribute for the user client 2 from the access information and data stored in a security repository 35, 36, 37.

Preferably, the token security microservice 30 is further configured to generate a token, said token allowing an access to all the intensive computing solutions accessible to said user client 2 based on the at least one determined role attribute.

Preferably, although the token security microservice 30 forms part of a computer system 1 for managing data streams 1 according to the invention, it is advantageously hosted on one or several different computer devices (e.g. servers) distinct from the computer device(s) hosting the proxy microservice 20 and/or the computing microservices 50, 51, 52, 53.

The token security microservice 30 can be configured to route the incoming requests towards the appropriate service as a function of the specified endpoint, of the logic and/or of the arguments.

Particularly, the token security microservice 30 coupled to the proxy microservice 20 can be configured to point towards (or be linked to) a particular service or server. The token security microservice 30 can be configured to access a plurality of directories, preferably at least LDAP (Lightweight Directory Access Protocol) type directories 35, a service for storing and managing an information system such as the known solution Active Directory® 36 and an authentication system such as the known authentication protocol Kerberos® 37.

Furthermore, the token security microservice 30 can advantageously be configured so as to be able to assign shared roles or specific roles, preferably it is configured so as to be able to assign a role shared by all the computing microservices 50, 51, 52, 53.

Furthermore, a computer system 1 for managing the data streams according to the invention can also include a management microservice 55. Such a management microservice could be connected to the computing microservices 50, 51, 52, 53, to the proxy microservice and to the token security microservice. In addition, this management microservice can be configured to distribute the computing tasks between the computing means and to order them. Particularly, it can be configured to organize the optimal execution of the tasks by the different intensive computing solutions available. Furthermore, such a management microservice 55 could be linked to a service 75 dedicated to scheduling.

Furthermore, the computer system 1 for managing the data streams according to the invention can also include a remote visualization server 80, preferably a 3D remote visualization server.

Such a remote visualization server 80 allows user clients 2 to execute interactive 2D/3D graphics applications on remote servers instead of their system, and to open visualization sessions to control them remotely. Thus, all of the computing and rendering of the graphics applications, including the 3D rendering, is carried out on the server side on dedicated resources. The keyboard and mouse inputs from the user client 2 are transferred to the server which, in return, encodes the graphics scene in pixels and returns the data in the form of video stream to the user client 2. The user client 2 is then only responsible for the rendering of the 2D video stream. Such a server allows working only on remote data without having to transfer it over the network. Generally indeed, the computing result files can be very large (from gigabytes to terabytes) and cannot be transferred efficiently via Internet or corporate private networks. Furthermore, such a remote visualization associated with the management of the authorizations according to the invention allows increasing the security of the technology.

What is claimed is:

1. A method for managing data streams accessible at an aggregated interface of a user client for unified governance of a plurality of intensive computing solutions able to generate execution data for intensive computing operations,
said plurality of intensive computing solutions including at least two solutions selected from
a high performance computing server,
a server dedicated to supervised or unsupervised learning,
a server dedicated to quantum computing,
wherein said plurality of intensive computing solutions each include an independent service and are not configured to work together, and
wherein each intensive computing solution of said plurality of intensive computing solutions comprises different business logics and different specificities;
said method for managing the data streams being implemented at least partly by a computer system for managing the data streams, said computer system comprising
a proxy microservice that manages the plurality of intensive computing solutions, wherein said proxy microservice is a single proxy microservice,
a plurality of computing microservices comprising a computing microservice for each of the plurality of intensive computing solutions and different business logics thereof, and
at least a first database configured to store said execution data for the intensive computing operations;
said method for managing the data streams comprising:
storing execution data for said plurality of intensive computing solutions, including
receiving, by a first computing microservice of said plurality of computing microservices, first execution data for said intensive computing operations generated by a first intensive computing solution of said plurality of intensive computing solutions,
transmitting of the first execution data for said intensive computing operations that is received to the proxy microservice,
storing, by the proxy microservice, on the at least a first database, the first execution data for said intensive computing operations,
receiving, by a second computing microservice of said plurality of computing microservices, second execution data for said intensive computing operations generated by a second intensive computing solution of said plurality of intensive computing solutions,
transmitting the second execution data for said intensive computing operations that is received to the proxy microservice, and
storing, by the proxy microservice, on the at least a first database, the second execution data for said intensive computing operations;
transmitting at least a portion of the execution data for said plurality of intensive computing solutions, including
receiving, by the proxy microservice, a request for information on execution of said intensive computing operations of said user client,
identifying, by the proxy microservice, on the at least a first database, the execution data for said intensive computing operations corresponding to the request for information, and
transmitting, by the proxy microservice, the execution data for said intensive computing operations corresponding to the request for information that is identified to the user client.

2. The method for managing data streams according to claim 1, wherein the receiving of the first execution data for intensive computing operations comprises receiving a message coming from said first intensive computing solution.

3. The method for managing data streams according to claim 1, wherein data generated by the first intensive computing solution have been sent by a scheduler of the first intensive computing solution.

4. The method for managing data streams according to claim 1, wherein data generated by the second intensive computing solution have been sent by a scheduler of the second intensive computing solution.

5. The method for managing data streams according to claim 1, wherein storage, on the at least a first database, of the second execution data for intensive computing operations includes only storage of most recent execution data for intensive computing operations.

6. The method for managing data streams according to claim 1, wherein the plurality of intensive computing solutions include servers coupled to schedulers configured to
plan an execution of at least a subset of said intensive computing operations on the servers,
monitor the execution of the subset of said intensive computing operations, and
transmit the execution data that is generated for said subset of said intensive computing operations to said computing microservice for each of the plurality of intensive computing solutions.

7. The method for managing data streams according to claim 1, wherein the transmitting of said at least said portion of the execution data for the plurality of intensive computing solutions includes an automated and recurring transmission of the execution data for said intensive computing operations that is identified to the user client.

8. The method for managing data streams according to claim 1, wherein the aggregated interface comprises a plurality of portlets, each portlet of said plurality of portlets being associated with an intensive computing solution of said plurality of intensive computing solutions, and wherein the transmitting of said at least said portion of the execution data for the plurality of intensive computing solutions includes a transmission of the execution data for said intensive computing operations of a given one of said plurality of intensive computing solutions to the each portlet associated therewith.

9. The method for managing data streams according claim 1, wherein the computer system for managing the data streams further comprises at least a second database configured to store instruction data for said intensive computing operations, and wherein said method for managing the data streams further comprises
storing said instruction data for said intensive computing operations, including
receiving, by the proxy microservice, a first computing request from said user client, said first computing request including first instruction data for said intensive computing operations, storing, on the at least a second database, the first instruction data for said intensive computing operations, receiving, by the proxy microservice, a second computing request from the user client, said second computing request including second instruction data for said intensive computing operations, storing, on the at least a second database, the second instruction data for said intensive computing operations;

transmitting at least a portion of said instruction data for said intensive computing operations, including identifying, by the proxy microservice on the at least a second database, of untransmitted instruction data for said intensive computing operations, identifying, by the proxy microservice, a destination intensive computing solution for each of the untransmitted instruction data for said intensive computing operations, and transmitting, by the proxy microservice, the untransmitted instruction data for said intensive computing operations to the computing microservice of each of the destination intensive computing solution for each of the untransmitted instruction data.

10. The method for managing data streams according to claim 9, wherein the computer system for managing the data streams further comprises a scheduler coupled to the at least a second database configured to plan the transmitting, by the proxy microservice, of the untransmitted instruction data for said intensive computing operations, to the computing microservice of each of the destination intensive computing solution for each of the untransmitted instruction data.

11. The method for managing data streams according to claim 1, wherein the first execution data for intensive computing operations and the second execution data for intensive computing operations are selected among:
computing input files accessible and processable by several of said plurality of intensive computing solutions;
computing results accessible and processable by several of said plurality of computing microservices;
energy consumption measurements;
resource use measurements;
system parameters;
descriptions of hardware infrastructures,
use index data for intensive computing processes; and
duration data before completion of the intensive computing operations.

12. The method for managing data streams according to claim 1, further comprising a procedure for generating an aggregated data accessible at the aggregated interface of the user client, said procedure for generating an aggregated data comprising receiving, by the proxy microservice, access command information of said user client, contained in a message coming from the aggregated interface, determining data accessible to the user client, by each of the plurality of computing microservices, said determining being based at least partly on the access command information, determining data to be aggregated, by the proxy microservice, from the data accessible to the user client determined by said each of the plurality of computing microservices, generating an aggregated data from the data to be aggregated, by the proxy microservice, from the data accessible to the user client determined by said each of the plurality of computing microservices, and transmitting the aggregated data, by the proxy microservice, to the aggregated interface of the user client.

13. The method for managing data streams according to claim 12, further comprising a determination of redundant data, by the proxy microservice and from the data accessible to the user client determined by said each of the plurality of computing microservices.

14. The method for managing data streams according to claim 1, wherein the unified governance is ensured by said computer system for managing the data streams further comprising
a token security microservice,
at least one security repository, and
at least one authorization repository,
said method further comprising a procedure for managing authorizations granted to the user client, said procedure comprising receiving, by the token security microservice, access information of the user client, authenticating the user client and determining, by the token security microservice, at least one role attribute for the user client from the access information and data stored in the at least one security repository, generating a token, by the token security microservice, said token allowing an access to all intensive computing solutions accessible to said user client based on the at least one role attribute that is determined, and determining authorizations granted to the user client, by at least one computing microservice of said plurality of computing microservices, said determining being based on the at least one role attribute that is determined and data contained in the at least one authorization repository.

15. The method for managing data streams according to claim 1, further comprising a step during which instructions received by the proxy microservice are processed so as to organize their optimal execution by different intensive computing solutions available.

16. A computer system for managing data streams accessible at an aggregated interface of a user client for unified governance of a plurality of accessible intensive computing solutions able to generate execution data for intensive computing operations,
said plurality of accessible intensive computing solutions including at least two solutions selected from
a high performance computing server,
a server dedicated to supervised or unsupervised learning,
a server dedicated to quantum computing,
wherein said plurality of accessible intensive computing solutions each include an independent service and are not configured to work together, and
wherein each intensive computing solution of said plurality of accessible intensive computing solutions comprises different business logics and different specificities;
said computer system for managing the data streams comprising:
a proxy microservice that manages the plurality of accessible intensive computing solutions, wherein said proxy microservice is a single proxy microservice,
a plurality of computing microservices comprising a computing microservice for each of the plurality of accessible intensive computing solutions and different business logics thereof, and at least a first database configured to store execution data for said intensive computing operations;

wherein said computer system for managing the data streams is configured to execute storing execution data for said plurality of accessible intensive computing solutions, including
- receiving, by a first computing microservice of said plurality of computing microservices, first execution data for said intensive computing operations generated by a first intensive computing solution of said plurality of accessible intensive computing solutions,
- transmitting of the first execution data for said intensive computing operations that is received to the proxy microservice,
- storing, by the proxy microservice, on the at least a first database, the first execution data for said intensive computing operations,
- receiving, by a second computing microservice of said plurality of computing microservices, second execution data for said intensive computing operations generated by a second intensive computing solution of said plurality of accessible intensive computing solutions,
- transmitting the second execution data for said intensive computing operations that is received to the proxy microservice, and
- storing, by the proxy microservice, on the at least a first database, the second execution data for said intensive computing operations;

transmitting at least a portion of said execution data for said plurality of accessible intensive computing solutions, said transmitting including
- receiving, by the proxy microservice, a request for information on execution of said intensive computing operations from the user client,
- identifying, by the proxy microservice, on the at least a first database, the execution data for said intensive computing operations corresponding to the request for information, and
- transmitting, by the proxy microservice, the execution data for said intensive computing operations corresponding to the request for information that is identified to the user client.

17. The computer system for managing data streams according to claim 16, wherein each of the plurality of computing microservices is configured to communicate with the plurality of accessible intensive computing solutions and schedulers thereof.

18. The computer system for managing data streams according to claim 16, each intensive computing solution of said plurality of accessible intensive computing solutions having a transmission frequency of said execution data for one or more of said plurality-intensive computing operations specific thereto and different from transmission frequencies for other accessible intensive computing solutions of said plurality of accessible intensive computing solutions.

19. The computer system for managing data streams according to claim 16, wherein each of the plurality of computing microservices includes a data memory capable of storing last values of a plurality of parameters relating to an intensive computing solution of the plurality of accessible intensive computing solutions to which it is linked.

* * * * *